United States Patent
Sibole

[19]

[11] Patent Number: 6,047,606
[45] Date of Patent: *Apr. 11, 2000

[54] COMBINATION BOLT SIZING TOOL

[76] Inventor: R. Wade Sibole, P.O. Box 2768, Prince Frederick, Md. 20678

[*] Notice: This patent issued on a continued prosecution application filed under 37 CFR 1.53(d), and is subject to the twenty year patent term provisions of 35 U.S.C. 154(a)(2).

[21] Appl. No.: 09/073,737

[22] Filed: May 6, 1998

[51] Int. Cl.[7] ................................................. G01M 19/00
[52] U.S. Cl. ...................... 73/865.8; 33/501.08; 33/501.7
[58] Field of Search ................. 73/865.8, 432.1; 33/501.05, 501.08, 501.45, 501.7, 555.1, 555.2

[56] References Cited

U.S. PATENT DOCUMENTS

| | | |
|---|---|---|
| 191,315 | 5/1877 | Coleman . |
| 318,051 | 5/1885 | Starrett . |
| 987,703 | 3/1911 | Curtin . |
| 1,107,276 | 8/1914 | Farrington . |
| 1,875,784 | 9/1932 | Walker . |
| 2,498,171 | 2/1950 | Michler .................................... 33/168 |
| 4,283,858 | 8/1981 | Sobczak ................................ 33/174 R |
| 4,517,747 | 5/1985 | Morin ..................................... 33/178 B |
| 4,677,751 | 7/1987 | Masseth ................................. 33/143 M |
| 5,471,757 | 12/1995 | McDonald ............................ 33/501.45 |
| 5,617,644 | 4/1997 | Bonelli ..................................... 33/548 |
| 5,875,558 | 3/1999 | Bakke et al. ......................... 33/501.45 |

*Primary Examiner*—Max Noori
*Attorney, Agent, or Firm*—David Newman Chartered

[57] ABSTRACT

A combination bolt sizing tool comprising an upper surface plate, a lower surface plate, a pivot pin, a tensioning wheel and a plurality of bolt-sizer blades. The pivot pin connects the upper surface plate to the lower surface plate. The plurality of bolt-sizer blades are pivotally mounted by the pivot pin such that the free end of each blade may be rotated outward for use and then rotated back between the upper and lower surface plates. The tensioning wheel controls pressure on the blades, making them easier or harder to pivot.

The free end of each bolt-sizer blade has a circular cutout of a specified diameter. The specified diameter of each bolt-sizer blade is different than the specified diameter of the circular cut-outs of other bolt-sizer blades. Each blade is visibly marked with the size of its respective circular cutout. The tool may include a second plurality of bolt-sizing blades, held by a second pivot pin, or a plurality of thread-pitch gauges held by the second pivot pin.

1 Claim, 1 Drawing Sheet

COMBINATION BOLT SIZING TOOL

BACKGROUND OF THE INVENTION

This invention relates to hand-held tools and more particularly to hand-held tools for measuring sizes and/or gauges of particular items of hardware.

DESCRIPTION OF THE RELEVANT ART

Mechanics engaged in the repair of a mechanical device often utilize measuring tools to assist them in determining the sizes of various hardware they encounter. Determining these sizes quickly and accurately saves time and effort on the part of the mechanic.

Many persons engaged in mechanical repair today did not have the benefit of earlier experience with tools and hardware. Hence, it is often difficult for such persons to estimate the sizes of bolts from merely a visual examination. This is particularly true when one considers that many bolts are in metric sizes which can be very close to their nearest English counterpart. As a result, it is often necessary for both experienced and inexperienced mechanics alike to attempt to match a number of wrench sizes to the bolt before the correct size is determined which can be time consuming. In addition, if the sizes are quite close and the incorrect size wrench is inadvertently used, damage to the bolt may result, preventing the bolt from being removed or replaced in the traditional manner. This also wastes time and can incur additional expense in repair or replacement of the bolt.

Furthermore, when working on a machine or other hardware, mechanics find it convenient to have the measuring tools they need constantly on-hand, ready for immediate use. Therefore, if two or more related tools are normally needed, it is desirable to have multiple tools combined into a single compact tool that can be easily carried and used as needed.

SUMMARY OF THE INVENTION

A general object of the invention is a compact, simple and inexpensive tool which combines the advantages of a bolt sizing tool and a thread pitch gauge.

Another object of the invention is an improved measuring tool for use by machinists, mechanics, engineers or the like, that will enable the user to quickly and accurately determine the wrench size of a bolt.

An additional object of the invention is a measuring device for providing an easy and convenient means of determining the number of threads to the inch upon screwthreads of taps, dies, bolts, nuts, etc.

A further object of the invention is a combination bolt sizing tool that combines U.S. and metric unit bolt sizing blades.

According to the present invention, as embodied and broadly described herein, a combination bolt sizing tool is provided. The combination bolt sizing tool comprises an upper surface plate, a lower surface plate, fastening means, and a plurality of bolt-sizer blades. The fastening means connects the upper surface plate to the lower surface plate. The plurality of bolt-sizer blades are pivotally mounted by the fastening means such that the free end of each blade may be rotated outward for use and then rotated back between the upper and lower surface plates for storage. The fastening means may further include a tensioning wheel for controlling pressure on the plurality of bolt-sizer blades so as to facilitate or prevent rotation of the blades around the fastening means.

The free end of each bolt-sizer blade has a cutout of a specified diameter. The specified diameter of each bolt-sizer blade is different than the specified diameter of the cut-outs of other bolt-sizer blades. In the preferred embodiment, the cutouts are circular and are graduated in size in predetermined increments. Each blade is visibly marked with the size of its respective circular cutout.

The combination bolt-sizer tool may further include a second plurality of bolt-sizer blades at an end of the tool opposite the first plurality of bolt-sizer blades. Alternatively, the bolt-sizer tool may include a plurality of thread-pitch gauges at the end of the tool opposite the first plurality of bolt-sizer blades.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
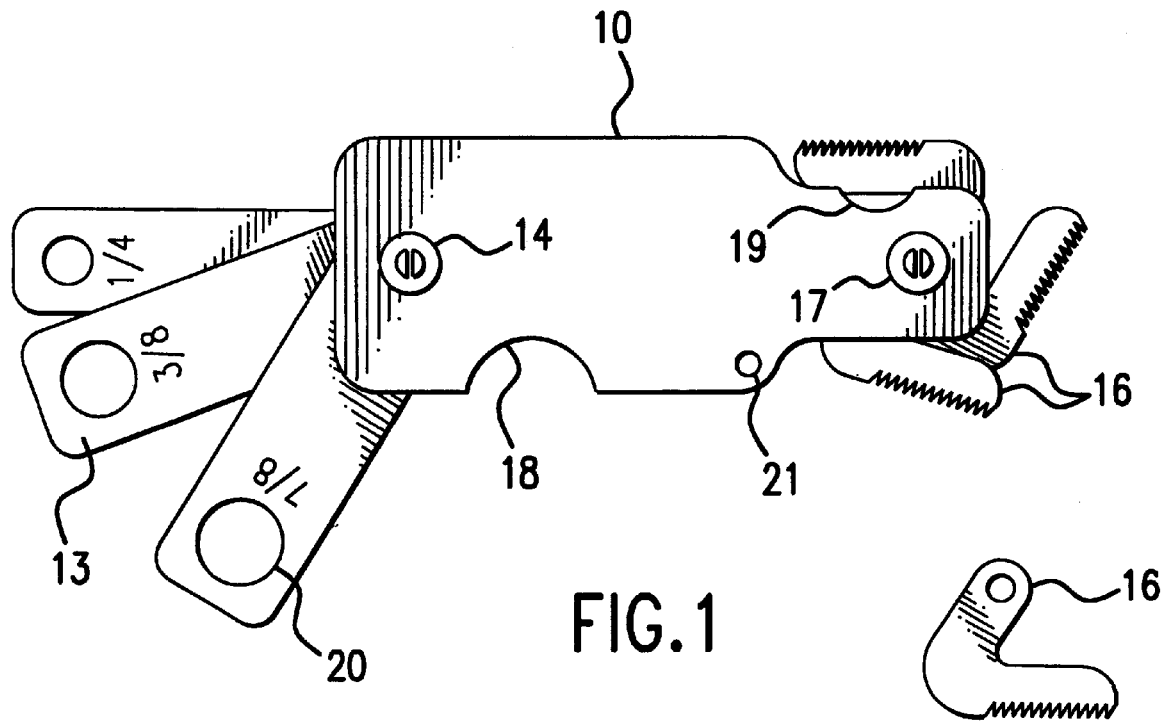
FIG. 1 illustrates a top view of the preferred embodiment.

Reference now is made in detail to the present preferred embodiments of the invention, examples of which are illustrated in the accompanying drawings, wherein like reference numerals indicate like elements throughout the several views.

The measuring tool of the present invention includes an upper surface plate, a lower surface plate, fastening means, and a plurality of bolt-sizer blades. The tool may further include second fastening means, and a second plurality of measuring blades. The second plurality of measuring blades may be a second plurality of bolt-sizer blades or a plurality of thread-pitch gauges. In one of the preferred embodiments, the first plurality of bolt-sizer blades is for measuring bolt size in U.S. units and the second plurality of bolt-sizer blades is for measuring bolt size in metric units. It should be pointed out that the second plurality of measuring blades may include any measuring device employing a series of blades used for deriving a specific measurement.

As illustratively shown in FIG. 1, the present invention includes an upper surface plate 10 and a plurality of bolt-sizer blades 13. In the preferred embodiment, each of the plurality of bolt-sizer blades 13 has a circular cutout 20 of a specified diameter. The diameter is etched or stamped on the surface of the bolt-sizer blade. Alternatively, the cutout portions of the plurality of bolt-sizer blades may be square, rectangular, hexagonal or any other shape that would enable the bolt-sizing function of the tool to be accomplished.

In the preferred embodiment, the upper surface plate 10 of the measuring tool of the present invention includes a first finger notch 18 which helps the user of the tool to select and pivot a particular one of the plurality of bolt-sizer blades 13.

The measuring device may further include a plurality of thread-pitch blades 16. Each of the plurality of thread-pitch blades 16 has a plurality of teeth of a specified number per inch. The number of teeth per inch is etched or stamped on the surface of each of the plurality of thread-pitch blades 16. In this preferred embodiment, the upper surface plate 10 of the measuring tool of the present invention includes a second finger notch 19 which helps the user of the tool to select and pivot a particular one of the plurality of thread-pitch blades 16.

Figure 2:
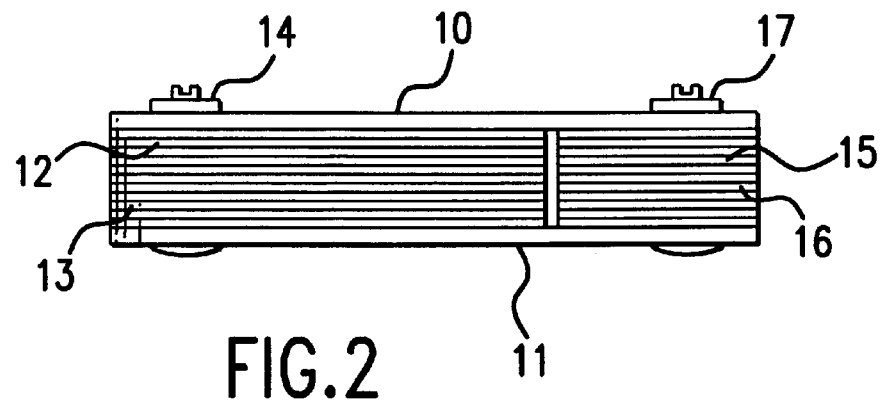
FIG. 2 illustrates a side view of the preferred embodiment.

FIG. 2 shows a side view of the present invention. First fastening means is embodied as a first pivot pin 12 and a first tensioning wheel 14. The first pivot pin 12 connects the upper surface plate 10 to a lower surface plate 11. The first pivot pin 12 also mounts the plurality of bolt-sizer blades 13 in stacked, rotatable relationship to one another. The tensioning wheel 14 may be used to control the pressure on the plurality of bolt-sizer blades 13, making the blades easier or harder to pivot depending on the adjustment of the wheel 14. First fastening means may also be embodied as a bolt or pivot pin exerting a set tension on the bolt-sizer blades, or as any other mechanism for mounting the blades and allowing the blades to pivot thereupon, with or without tension adjustment.

Second fastening means is embodied as a second pivot pin 15 and a second tensioning wheel 17. The second pivot pin 15 connects the upper surface plate 10 to the lower surface plate 11. The second pivot pin 15 also mounts the plurality of thread-pitch blades 16 in stacked, rotatable relationship to one another. The second tensioning wheel 17 may be used to control the pressure on the plurality of thread-pitch blades, making the blades easier or harder to pivot depending on the adjustment of the wheel 17. Second fastening means may also be embodied as a bolt or pivot pin exerting a set tension on the thread-pitch blades, or as any other mechanism for mounting the blades and allowing the blades to pivot thereupon, with or without tension adjustment.

The lower surface plate 11 may also include finger notches. The lower surface plate 11 may, but does not have to, be the same shape as the upper surface plate 10.

In the preferred embodiment, the upper and lower surface plates are between three and four inches in length and between one and one and a half inches in width. These measurements are representative and are not intended to be limiting. A specific embodiment may be 3.685" in length, 1.25" in width and 0.75" in thickness. Variations may be made to the shape of the upper and lower surface plates without changing the function of the invention. Additionally, the upper and/or lower surface plates may include cutouts for attaching fasteners such as would be used to attach the tool to one's belt or tool apron. Such a cutout may be embodied as a quarter inch circular cutout 21, or as any other shape cutout useful for the stated purpose.

The present invention may also be embodied as a combination bolt-sizer tool having a first plurality of bolt-sizer blades at one end and a second plurality of bolt-sizer blades at the other end. With reference to FIG. 1, in this alternative embodiment, the second plurality of bolt-sizer blades would be located in the place of the plurality of thread-pitch blades. The first plurality of bolt-sizer blades could be constructed for measuring in U.S. units while the second plurality of bolt-sizer blades could be constructed for measuring in metric units. Alternatively, both pluralities of bolt-sizer blades could offer additional U.S. sizes or additional metric sizes.

The number of blades in the plurality of bolt-sizer blades is a design consideration and may be varied according to need. In a preferred embodiment, ten blades are included with U.S. measurements (in inches) as follows:

| | |
|---|---|
| 1/4 | 9/16 |
| 5/16 | 5/8 |
| 3/8 | 3/4 |
| 7/16 | 7/8 |
| 1/2 | 1 |

As shown in FIG. 1, in the preferred embodiment the blades are of different widths, with the blade for measuring a quarter inch bolt being the narrowest and the blade for measuring an inch bolt being the widest. In the preferred embodiment, the narrowest blade has a width of approximately one-half inch while the widest blade has a width of approximately an inch and a quarter. Of course, other width ranges are possible. While the blades could be constructed so as to be of equal widths, graduated widths make the blades easier for the user to fan through and locate an appropriate blade. Graduated widths also reduce construction costs and weight of the tool as less metal is required for the narrower blades. In the preferred embodiment, each blade is between two and two and a half inches in length and approximately 0.062 inches in thickness, but these dimensions are representative and are not intended to be limiting.

Similarly, the number of blades in the plurality of thread-pitch blades is a design consideration and may be varied according to need. In a preferred embodiment, twelve blades are included with U.S. measurements (in threads per inch) as follows:

| | |
|---|---|
| 8 | 14 |
| 9 | 16 |
| 10 | 18 |
| 11 | 20 |
| 12 | 24 |
| 13 | 28 |

In all cases more or fewer blades may be included as necessary in view of the measurement sizes required. The approximate thickness of the preferred embodiment when equipped with ten bolt-sizer blades and twelve thread-pitch blades is between one half and three quarters of an inch.

In an alternative embodiment, the present invention may comprise an upper surface plate, a lower surface plate, fastening means, and a plurality of bolt-sizer blades. The fastening means connects the upper surface plate to the lower surface plate. The plurality of bolt-sizer blades are pivotally mounted by the fastening means such that the free end of each blade may be rotated outward for use and then rotated back between the upper and lower surface plates for storage. Fastening means may be embodied as a pivot pin or bolt exerting a set tension on the blades. Means may be included for "locking" a selected blade in the extended position during use and for subsequently releasing the "locked" blade for rotation back between the upper and lower surface plates for storage. Such locking and release means may be embodied using techniques as are employed to secure and then release an extended cutting blade in a pocket knife, for example. Such techniques are known in the art.

As in the preferred embodiment, the alternate embodiment may further include a second plurality of measuring blades and second fastening means. The second plurality of measuring blades may include bolt-sizer blades, thread-pitch blades or any other similar measuring device employing a series of blades used for deriving a specific measurement.

The measuring tool may be constructed of steel with zinc oxide coating or in accordance with any other design alternatives as is known in the art. The sizes of the cutouts and of the thread-pitch blades may be etched or stamped into the surface of the blade, or marked in any other permanent and legible manner as is known in the art. Circular cutouts are measured by diameter; polygonal cutouts having an even number of sides such as square or hexagonal cutouts are measured by the distance between opposite parallel sides of the polygon. Cutouts having an odd number of sides would be measured in accordance with accepted standards and practices for such shapes in the relevant industry.

It will be apparent to those skilled in the art that various modifications can be made to the combined bolt sizing tool of the instant invention without departing from the scope or spirit of the invention, and it is intended that the present invention cover modifications and variations of the combined bolt sizing tool provided they come within the scope of the appended claims and their equivalents.

I claim:

1. A measuring tool having a first end and a second end, comprising:

an upper surface plate having a first upper-finger notch at one edge and a second upper-finger notch at an opposite edge;

a lower surface plate having a first lower-finger notch at one edge and a second lower-finger notch at an opposite edge;

a first pivot pin mounted at the first end for connecting the upper surface plate to the lower surface plate;

a second pivot pin mounted at the second end for connecting the upper surface plate to the lower surface plate;

a plurality of bolt-size blades pivotally mounted by said first pivot pin, a free end of each bolt-size blade from the plurality of bolt-size blades having a circular cutout with a specified diameter for measuring a diameter of a specific bolt from a plurality of bolts, respectively, the specified diameter being different than the specified diameter of the circular cut-outs of other bolt-size blades, with the first upper-finger notch and the first lower-finger notch for assisting a user of the measuring tool to select and pivot a particular bolt-size blade of the plurality of bolt-size blades;

a first tension wheel connected to the first pivot pin for controlling pressure on the plurality of bolt-size blades;

a plurality of thread-pitch blades pivotally mounted by said second pivot pin, a free end of each thread-pitch blade from the plurality of thread-pitch blades having a plurality of teeth of a specified number per any of inch and metric distance, for measuring a plurality of thread pitches of the plurality of bolts, respectively, the specified number being different than the specified number of teeth of other thread-pitch gauges, with the second upper-finger notch and the second lower-finger notch near the second pivot pin for assisting a user of the measuring tool to select and pivot a particular thread-pitch blade of the plurality of thread-pitch blades;

a second tension wheel connected to the second pivot pin for controlling pressure on the plurality of thread-pitch blades;

a first tensioning wheel, connected to said first pivot pin, for controlling pressure on the plurality of bolt-size blades; and a second tensioning wheel, connected to said second pivot pin, for controlling pressure on the plurality of thread-pitch blades.

* * * * *